(12) United States Patent
Anderson et al.

(10) Patent No.: US 10,828,953 B2
(45) Date of Patent: Nov. 10, 2020

(54) SELF-DRIVING VEHICLE WITH INTEGRATED ACTIVE SUSPENSION

(71) Applicant: ClearMotion, Inc., Billerica, MA (US)

(72) Inventors: Zackary Martin Anderson, Cambridge, MA (US); Marco Giovanardi, Melrose, MA (US)

(73) Assignee: ClearMotion, Inc., Billerica, MA (US)

(*) Notice: Subject to any disclaimer, the term of this patent is extended or adjusted under 35 U.S.C. 154(b) by 241 days.

(21) Appl. No.: 15/832,517

(22) Filed: Dec. 5, 2017

(65) Prior Publication Data

US 2018/0154723 A1    Jun. 7, 2018

Related U.S. Application Data

(60) Division of application No. 14/242,691, filed on Apr. 1, 2014, now abandoned, which is a continuation of
(Continued)

(51) Int. Cl.
*B60G 17/019* (2006.01)
*B60G 17/015* (2006.01)
(Continued)

(52) U.S. Cl.
CPC ............ *B60G 17/00* (2013.01); *B60G 11/265* (2013.01); *B60G 17/015* (2013.01);
(Continued)

(58) Field of Classification Search
None
See application file for complete search history.

(56) References Cited

U.S. PATENT DOCUMENTS

| 5,360,445 A | 11/1994 | Goldowsky |
| 6,025,665 A | 2/2000 | Poag |

(Continued)

FOREIGN PATENT DOCUMENTS

| EP | 1 961 960 A2 | 8/2008 |
| WO | WO 2005/108128 A2 | 11/2005 |

(Continued)

OTHER PUBLICATIONS

U.S. Appl. No. 14/242,691, filed Apr. 1, 2014, Anderson et al.
(Continued)

*Primary Examiner* — Thomas G Black
*Assistant Examiner* — Ana D Thomas
(74) *Attorney, Agent, or Firm* — Wolf, Greenfield & Sacks, P.C.

(57) ABSTRACT

A self-driving vehicle with an integrated fully-active suspension system. The fully-active suspension utilizes data from one or more sensors used for autonomous driving (e.g. vision, LIDAR, GPS) in order to anticipate road conditions in advance. The system builds a topographical map of the road surface. Suspension and road data is delivered back to the vehicle in order to change autonomous driving behavior including route planning. Energy storage is regulated based on a planned route. Forward and lateral acceleration feel is mitigated through active pitch and tilt compensation. The fully-active suspension pushes and pulls the suspension in three or more operational quadrants in order to deliver superior ride comfort, handling, and/safety of the vehicle.

24 Claims, 7 Drawing Sheets

Related U.S. Application Data application No. PCT/US2014/029654, filed on Mar. 14, 2014.

(60) Provisional application No. 61/930,452, filed on Jan. 22, 2014, provisional application No. 61/913,644, filed on Dec. 9, 2013, provisional application No. 61/865,970, filed on Aug. 14, 2013, provisional application No. 61/815,251, filed on Apr. 23, 2013, provisional application No. 61/789,600, filed on Mar. 15, 2013.

(51) Int. Cl.
| | | |
|---|---|---|
| *B60G 17/00* | (2006.01) | |
| *B60G 17/018* | (2006.01) | |
| *H02K 29/08* | (2006.01) | |
| *H02K 7/14* | (2006.01) | |
| *H02K 7/18* | (2006.01) | |
| *F16F 9/512* | (2006.01) | |
| *H02K 5/12* | (2006.01) | |
| *B60G 11/26* | (2006.01) | |
| *B60G 17/0195* | (2006.01) | |
| *B60G 17/08* | (2006.01) | |
| *H02K 29/10* | (2006.01) | |
| *H02K 11/215* | (2016.01) | |
| *H02K 11/22* | (2016.01) | |
| *F16F 9/19* | (2006.01) | |
| *H02P 6/16* | (2016.01) | |

(52) U.S. Cl.
CPC ......... *B60G 17/018* (2013.01); *B60G 17/019* (2013.01); *B60G 17/0152* (2013.01); *B60G 17/0195* (2013.01); *F16F 9/512* (2013.01); *H02K 5/12* (2013.01); *H02K 7/14* (2013.01); *H02K 7/1823* (2013.01); *H02K 29/08* (2013.01); *B60G 17/08* (2013.01); *B60G 2400/90* (2013.01); *F16F 9/19* (2013.01); *H02K 11/215* (2016.01); *H02K 11/22* (2016.01); *H02K 29/10* (2013.01); *H02P 6/16* (2013.01)

(56) References Cited

U.S. PATENT DOCUMENTS

| | | |
|---|---|---|
| 6,190,319 B1 | 2/2001 | Goldowsky |
| 6,227,817 B1 | 5/2001 | Paden |
| 6,502,837 B1 | 1/2003 | Hamilton et al. |
| 8,075,002 B1 | 12/2011 | Pionke et al. |
| 9,446,651 B2 | 9/2016 | Giovanardi et al. |
| 9,662,955 B2 * | 5/2017 | Popham ............. B60G 17/0165 |
| 2003/0000765 A1 | 1/2003 | Spadafora |
| 2003/0077183 A1 | 4/2003 | Franchet et al. |
| 2004/0096334 A1 | 5/2004 | Aldinger et al. |
| 2005/0060069 A1 | 3/2005 | Breed et al. |
| 2008/0190104 A1 | 8/2008 | Bresie |
| 2008/0234900 A1 * | 9/2008 | Bennett ................ B60G 17/019 701/48 |
| 2009/0143936 A1 * | 6/2009 | Craig .................... B60W 40/02 701/37 |
| 2009/0260935 A1 | 10/2009 | Avadhany et al. |
| 2010/0072760 A1 | 3/2010 | Anderson et al. |
| 2010/0262308 A1 | 10/2010 | Anderson et al. |
| 2010/0272547 A1 * | 10/2010 | Cottone ................ B25J 9/1697 414/426 |
| 2011/0303049 A1 | 12/2011 | Neelakantan et al. |
| 2014/0195112 A1 * | 7/2014 | Lu ....................... B60G 17/0165 701/37 |
| 2014/0195114 A1 | 7/2014 | Tseng et al. |

FOREIGN PATENT DOCUMENTS

| | | |
|---|---|---|
| WO | WO 2011/159874 A2 | 12/2011 |
| WO | WO 2012/167316 A1 | 12/2012 |

OTHER PUBLICATIONS

U.S. Appl. No. 15/300,500, filed Sep. 29, 2016, Anderson et al.
U.S. Appl. No. 16/094,681, filed Oct. 18, 2018, Giovanardi et al.
U.S. Appl. No. 16/130,311, filed Sep. 13, 2018, Sridhar et al.
International Search Report and Written Opinion dated Oct. 29, 2014 for International Application No. PCT/US2014/029654.

* cited by examiner

SELF-DRIVING VEHICLE WITH INTEGRATED ACTIVE SUSPENSION

CROSS-REFERENCE TO RELATED APPLICATIONS

This application is a divisional of U.S. application Ser. No. 14/242,691, filed on Apr. 1, 2014, which is a continuation of international application serial number PCT/US2014/029654, filed Mar. 14, 2014, which claims priority under 35 U.S.C. § 119(e) of U.S. provisional application Ser. No. 61/913,644, filed Dec. 9, 2013, U.S. provisional application Ser. No. 61/865,970, filed Aug. 14, 2013, U.S. provisional application Ser. No. 61/815,251, filed Apr. 23, 2013, and U.S. provisional application Ser. No. 61/789,600, filed Mar. 15, 2013, the disclosures of which are incorporated herein by reference in their entirety. U.S. application Ser. No. 14/242,691 also claims priority under 35 U.S.C. § 119(e) of U.S. provisional application Ser. No. 61/930,452, filed Jan. 22, 2014 the disclosure of which is incorporated herein by reference in its entirety.

BACKGROUND

Field

Disclosed embodiments are related to active suspension systems for autonomous vehicles.

Discussion of Related Art

Self-driving or autonomous vehicles enable passengers to spend time on tasks outside of driving. Many of these tasks require ride comfort and isolation from the road that is superior to that of conventional automobiles. Self-driving vehicles typically have a variety of sensors that assist with navigation, including look-ahead sensors such as vision and range-finding technologies.

Fully active suspension systems may provide superior ride, handling and comfort. This is accomplished by dynamically creating forces to control wheel motion. These are typically self-contained systems that comprise of sensors and actuators controlled by a central controller.

SUMMARY

Self-driving vehicles have a significant need for improved ride comfort, and have a number of sensors not typically available on conventional vehicles. The inventors have appreciated that active suspension technologies may be improved by integrating actuator control with vehicle sensors and networks. Further, self-driving vehicles may be improved by being responsive to road-related comfort characteristics.

Aspects relate broadly to control methodologies of active suspension systems and self-driving vehicles. More specifically, aspects relate to building topographical maps, route planning based on road roughness, regulating energy storage based on planned routes, and mitigating forward and lateral acceleration feel through adaptive pitch and tilt correction.

According to one aspect, an active suspension system comprises a number of active suspension actuators, typically one per wheel for the vehicle. Each active suspension actuator may operate in at least three force/velocity operational quadrants such that it may both resist an external motion input and actively push/pull. At least one forward-looking sensor is disposed on the vehicle such that it is capable of detecting a road condition the vehicle may encounter in the future. The vehicle comprises a location sensor such as a GPS receiver. The vehicle may further comprise at least one relative sensor that is capable of detecting relative movement between the vehicle and the ground, or the vehicle and a future road condition. Relative sensors may include sensors such as an IMU, accelerometer, speed sensor, etc. A sensor fusion system such as a Kalman Filter may combine the location data and relative data to obtain an accurate estimate of absolute position. For example, a sensor fusion system may bias the location sensor over the long term, but bias the relative sensor over the short term. Similarly, the sensor fusion system may eliminate extraneous points (for example, ignore a GPS coordinate reading if it has moved significantly farther than the vehicle could have moved given the current speed sensor reading). A memory system may comprise a topographical map. Any suitable memory system will suffice, but in some embodiments it may comprise of a processor-based vehicular electronic control unit (ECU) containing rewriteable memory. The topographical map may comprise three-dimensional terrain information. This may be implemented relative to the vehicle such that the map comprises relative X,Y coordinates from the center of the vehicle and a Z terrain/feature height for the road at each point. In such an embodiment, the topographical map indices may change at each iteration of the control loop. The system may also be implemented as an absolute map, wherein the X,Y coordinates relate to absolute positions such as GPS coordinates, and similarly the Z value indicates a terrain/feature height. An active suspension controller, which may be centralized, distributed among several processor or FPGA-based controllers with one at each actuator, co-located with another vehicle ECU, or any other suitable controller topology, may receive information from the sensor fusion system and the memory system containing the topological map. According to one aspect, the active suspension controller both controls the active suspension actuators in response to the topographical map and updates the topographical map based on a parameter sensed by either the active suspension actuators or the forward-looking sensor. Controlling the active suspension actuators may comprise changing a force, position, or other parameter of the actuators in order to mitigate a detected event in the topographical map. Updating the topographical map may comprise recording sensed future events from the forward-looking sensor, recording data from wheel impacts of the front or rear active suspension actuator sensors, or any other suitable data source wherein road data may be extracted and related to a position.

According to another aspect, a self-driving or navigation-guided vehicle performs route planning at least partially based on road roughness. A controller on the vehicle receives a driving plan that comprises an anticipated route for the vehicle, such as a GPS-guided route laid onto data from a roadway map database. Along a route of travel, road condition data is collected at a variety of points along the route. The controller determines a road roughness impact on the vehicle for at least a portion of the gathered points of road condition data. This may be a calculation based on the road condition data, or it may comprise the road condition data itself, depending on what data is stored. The self-driving or navigation-guided vehicle then adjusts the driving plan to reduce road roughness impact on the vehicle. For example, it may avoid a road that is particularly rough.

According to another aspect, an intelligent energy storage system regulates state of charge in a predictive fashion. According to this aspect, a plurality of electrical loads are connected to an electrical bus. Such electrical loads may include active suspension actuators, electric propulsion motors, electric power steering, an electric air compressor, electronically actuated stability control, and the like. The electrical bus may comprise an energy storage apparatus such as a rechargeable battery bank, super capacitors, and/or other suitable means of storing electrical energy. The energy storage apparatus may be characterized by a state of charge, which is a measure of the energy contained in the apparatus. The energy storage apparatus may be disposed to provide energy to at least a portion of the connected electrical loads on the bus. A power converter may be configured to provide power to the energy storage, thus changing its state of charge. Additionally, the loads may be electronically connected such that they also regulate the state of charge. An electronic controller for a self-driving vehicle calculates a driving plan, which is an anticipated route for the vehicle. A computer-based model or algorithm may predict or calculate energy usage by at least a portion of the plurality of loads at a variety of points along the route. According to one aspect, energy usage may be positive or negative (consumption or regeneration). While driving, the algorithm or model may then dynamically and predictively set a state of charge of the energy storage apparatus as a function of calculated energy usage for points along the route. In one example, if the algorithm calculates that a large amount of energy will be needed ahead, the power converter may put additional energy into the energy storage apparatus in order to accommodate the future consumption load.

According to another aspect, an active suspension system for a self-driving vehicle mitigates fore/aft and lateral acceleration feel through adaptive pitch and tilt corrections. The active suspension system comprises a plurality of active suspension actuators, with an actuator disposed at each wheel of the vehicle. Each actuator is capable of creating an active force between the vehicle chassis and the wheel. A self-driving controller, which may be a single controller or several controllers distributed in the vehicle, commands steering, acceleration, and deceleration of the vehicle during driving. An active suspension controller is in communication with the self-driving controller such that the active suspension controller receives feed-forward command and control information. This feed-forward information may include steering, acceleration, and deceleration signals from the self-driving controller. According to one aspect, this sensor data may be feedback data, such as measured fore/aft and lateral acceleration. An algorithm mitigates passenger disturbance caused by such fore/aft and lateral acceleration by creating a compensation attitude, or a pitch/tilt condition of the vehicle. The compensation attitude may be set using the active suspension actuators in response to the feed-forward steering, acceleration, and deceleration signals. According to one aspect, the compensation attitude is set using feedback data such as measured fore/aft and lateral acceleration. The algorithm commands a pitch-up attitude during deceleration (such as braking), a pitch-down attitude during acceleration, and a roll-in attitude during steering. According to one aspect, a pitch-up attitude comprises lifting the front of the vehicle such that its ride height is higher than the rear, a pitch-down attitude comprises lowering the front of the vehicle such that its ride height is lower than the rear, and a roll-in attitude comprises lowering the side of the vehicle on the inside radius of the turn such that its ride height is lower than the outside radius side of the vehicle. According to one aspect, in a force-limited saturation regime of the actuator, ride height command authority may be limited in comparison to large acceleration events causing large roll or pitch moments, and the control system may not fully achieve such compensation attitude behavior.

It should be appreciated that the foregoing concepts, and additional concepts discussed below, may be arranged in any suitable combination, as the present disclosure is not limited in this respect. In particular, while several embodiments are disclosed for self-driving vehicles, certain concepts may be used with human-operated vehicles as well. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
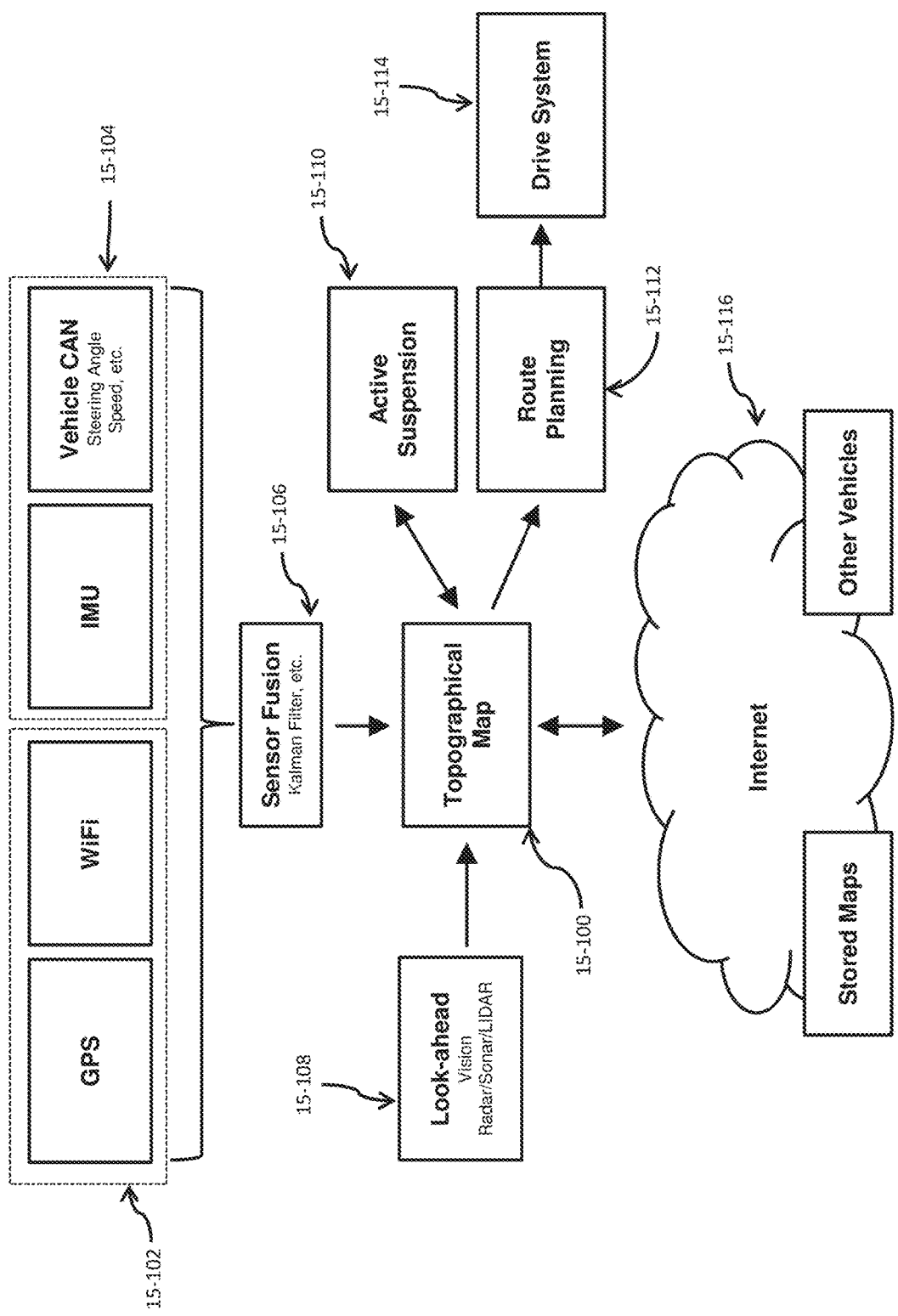
FIG. 1 is a diagram of a topographical road mapping system.

While self-driving vehicles and active suspension systems exist in the prior art, such systems have traditionally been separated stand-alone technologies. Significant ride benefits can be delivered to passengers by combining the sensing and command functions of self-driving vehicles with the command authority to change vehicle dynamics that a fully-active suspension provides.

Some aspects relate to vehicle systems that utilize topographical maps of the road surface. Such maps include positional information as well as road surface information such as road height. These maps may be highly granular in detail, showing individual road imperfections, bumps, potholes, and the like. These maps may be generated by a variety of means, including vision camera sensors, LIDAR, radar, and other planar or three-dimensional scanning sensors, and the like. The maps may also be generated by sensor information post-encounter, such as the front suspension actuators determining information about the road as they traverse terrain. These topographical maps may also be communicated from vehicle to vehicle over a network, or may be downloaded from servers in communication with the vehicle such as over a cellular network. The topographical maps may be used for a variety of control purposes, such as: adapting driving behavior (changing speed such as slowing down on a rough road; changing vehicle course such as choosing a less bumpy road to reach the destination, etc.); adapting active suspension system behavior (controlling actuator force/position in a predictive manner in response to road perturbations ahead, changing actuator force/position in the rear dampers to anticipate sensed events from the front dampers, etc.). Aspects also relate to plotting a trajectory of the vehicle and its elements (e.g. individual wheels) across the topographical map.

Other aspects relate to adapting driving behavior and route planning as a function of road roughness and the impact a road might have on the vehicle, and of collecting such data for future planning use.

Other aspects relate to the use of energy storage onboard a self-driving vehicle, wherein the energy storage is used to power electrical loads such as active suspension actuators, the drive motor of an electric car, EPS, ESP, ABS braking, etc. These aspects relate to predictively charging the energy storage based on an estimate of future energy needs of the vehicle. In some embodiments, this also relates to controlling electrical loads based on an estimate of future energy needs of the vehicle. According to one aspect, another input to such algorithms is energy availability, which may be a vehicle imposed current limit, or an overall energy storage capacity of an electric vehicle for a given trip.

Other aspects relate to controlling an active suspension to enhance comfort during acceleration and cornering of a self-driving vehicle. By controlling a compensation attitude of the vehicle using active suspension actuators, the vehicle may lean into a turn or acceleration, and lean back from a deceleration event.

FIG. 1 shows an embodiment of a topographical mapping system for a vehicle. A topographical map 15-100 comprises high-resolution terrain data for the vehicle. In some embodiments high resolution would encompass being able to detect road perturbations large enough to create a human-distinguishable impact on the vehicle if driven over. In other embodiments the resolution may be lower. The map may be represented as a relative map about the vehicle (for example, XY Cartesian distances from the vehicle or a polar coordinate system), as multiple relative maps about parts of the vehicle (for example, relative maps about each wheel), an absolute map comprising absolute positions (for example, GPS coordinates), or any other means of associated terrain height Z information or similar. In addition to or instead of terrain height data, the topological map may contain a generalized roughness metric or a correction metric for an active suspension. It may also be implemented as a pipelined control system, wherein such information is clocked through a control loop based on position changes of the vehicle. Any suitable means of representing topographical information may be used.

In this embodiment, the topographical map 15-100 is indexed by the current position. This map may start as populated, unpopulated, or partially populated. In order to use a high resolution topographical map, the vehicle needs an accurate method of localizing with respect to the map. Location sensors 15-102 are used to determine a location. Such sensors may include coordinates from a GPS receiver, WiFi access point recognition, honing beacon, DGPS triangulation methods, and/or other suitable sensors. In addition, the vehicle has at least one relative position sensor 15-104 such as an IMU, accelerometers, steering angle, vehicle speed, and/or other suitable sensors onboard. A sensor fusion system 15-106 processes the absolute position data using the relative position data to determine an accurate estimate of current location. One such method of sensor fusion is a Kalman Filter to recursively process the stream of noisy data from the location and relative position sensors to yield an accurate estimate of absolute position. Such a filter may contain data representing a physical model of the vehicle and its movement, and compare a prediction of vehicle location to actual measurement. Output from the sensor fusion system is a position metric that serves as either an index to the topographical map 15-100, or serves to transform the topographical map at each time update. For example, if the topographical map is a relative matrix of Z values ahead of the vehicle, the filtered position information may shift the current map XY position.

In another embodiment, the topographical map 15-100 may be purely relative to the vehicle, and only relative position sensors 15-104 are used in the sensor fusion system. In such an embodiment, the topographical map represents a local measure of terrain about the vehicle, and a method for accurately interpreting and using results from look-ahead sensors 15-108 by the active suspension system 15-110.

In the embodiment of FIG. 1, an active suspension system 15-110 is equipped on the vehicle. The fully active suspension is capable of operating in at least three operational quadrants of a force/velocity plot, which means it is capable of both damping movement and actively pushing or pulling the wheel. In one embodiment, the active suspension system receives data from the topological map and determines an incidence time and correction. In a simple implementation, a path may be calculated that represents a path through a plurality of points in the topographical map 15-100. This path may be a function of current steering angle and speed, or be based on a planned route. The planned route may be a combination of GPS/maps route planning and any obstacle avoidance procedures being employed by the self-driving vehicle to plan vehicle travel. The path may comprise of a single trajectory in a lower resolution map, of two paths, each representing a path of travel of the left and right sides of the vehicle respectively, or four paths, with each representing a path of travel of a wheel of the vehicle (in the case of a two axle vehicle). The active suspension then calculates an incidence time to each point corresponding with each wheel of the vehicle for which an active suspension actuator is disposed. The active suspension then calculates a correction, which comprises a force or position setting of the actuator at each wheel so as to mitigate impact of the event on the trajectory. In a simple embodiment example, if there were a twenty-five millimeter bump 300 milliseconds away from the left front wheel (the incent time could be calculated using current or planned vehicle speed), then the left front wheel might lift twenty-five millimeters just before impact of the event. A system model is used to calculate actuator response time so that it can prepare the actuator a suitable period of time prior to the wheel encountering the event. The active suspension system may employ several algorithms related to wheel damping, body control during turns, saturation handling, and other metrics that may require the active suspension to deviate from this simplified model, however, in many embodiments that use the topographical map, the terrain data is utilized as an input to the active suspension control system.

In addition to reacting in response to the topographical map 15-100, the active suspension system 15-110 may also share information with the topographical mapping system. Such data may comprise accelerometer data representing wheel or body movement, actuator position information, or any other metric that represents road input. In an illustrative embodiment, the front actuators of the vehicle encounter a bump, which moves the actuators a certain distance at a given force. The system then estimates topographical information from this and inserts it into the topographical map so that the rear actuators can use the data to respond to and so that future drive events can benefit from the knowledge. In an embodiment with this later implementation, the vehicle effectively employs a learning algorithm wherein it learns the road terrain as new roads are traversed, and then the next time it is driven the system can respond more effectively. This may be coupled with algorithms that adapt an already populated map as the same terrain is driven over multiple times so that a best estimate map is created. This learning function may be particularly important with topographical information because road surface condition changes frequently with wear/tear, road repairs, snow storms, etc.

The topographical map may also be used to modify route planning 15-112 and drive system 15-114 commands. For example, if a large obstruction in the road is detected (such as a pothole), the vehicle route planning 15-112 may navigate around the obstruction in order to reduce impact to the vehicle. On a road that exhibits a particularly rough road (which can be determined with various means from the topographical map such as looking at the frequency content and amplitude of perturbations), the route planning system may avoid the road and reroute to another suitable road with a smoother topographical footprint. In another example, the drive system 15-114 may simply reduce speed over a detected rough road.

In addition to the active suspension system in some embodiments communicating information to build/update the topographical map, the use of one or more look-ahead sensors 15-108 is similarly helpful. These are particularly useful due to their ability to sense road conditions prior to encountering them with the wheels of the vehicle. Several suitable look-ahead systems exist such as mono or stereo vision camera systems, radar, sonar, LIDAR, and other planar or three dimensional scanning systems. In some embodiments multiple look-ahead sensors are used in conjunction through a secondary fusion system in order to obtain a more accurate estimate of road conditions. These sensors may build a topographical map that expands beyond road surface conditions: they may detect curbs, edges of roads, street signs, other vehicles, pedestrians, buildings, etc. In some embodiments the system building the topological map may be the same system that is performing real-time autonomous driving and navigation. This subsystem may identify obstacles that are mobile objects and would be differentiated from in the topological map. For example, the vision sensor may detect a pedestrian in a crosswalk or another vehicle. Several methods are known in the art for differentiating such objects. A couple methods include object recognition systems that can detect human faces, outlines of vehicles, and such, or an algorithm that can detect if an object is moving with respect to an absolute coordinate system (i.e. the ground). In this way, non-permanent obstacles can be removed from or not inserted into the topographical map data.

In embodiments where the vehicle has a communications interface with external data sources, topographical map information may be shared. In one embodiment the vehicle has a cellular connection to the internet and dynamically uploads and downloads topographical map information from one or more servers. In another embodiment there is vehicle-to-vehicle communication wherein a vehicle ahead may communicate topographical or road surface information to the vehicle which can seed the topographical map 15-100 with a priori estimates. This topographical information can be stored with road map databases, and may even be directly coupled with road map systems such that road maps index terrain information. This can be at the overall road granularity level, or may be a matrix of data representing terrain information across the road at a higher resolution. The amount of topographical information stored can vary. A topographical map containing an entire route or even an entire region can be stored on the vehicle, or only a small window buffered onto local memory.

While the above embodiments have been described in the context of a self-driving vehicle, several inventions may equivalently or similarly relate to human-driven vehicles as well, including, without limitation, navigation-guided vehicles.

Figure 2:
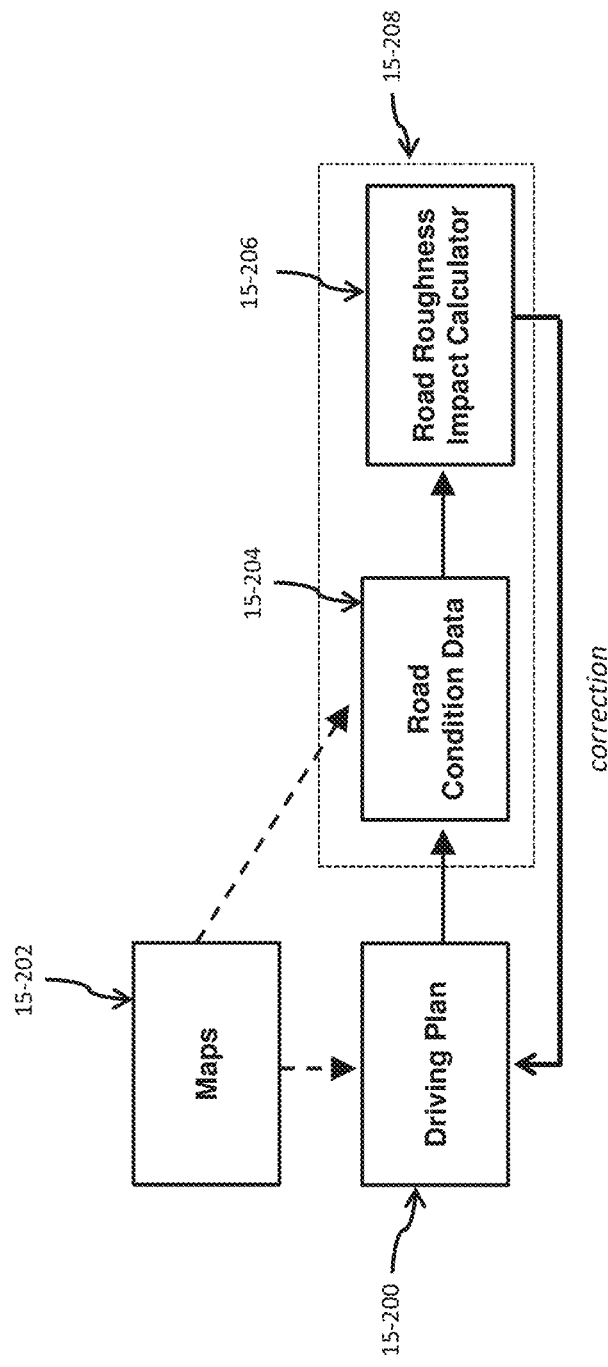
FIG. 2 is a block diagram of a route planning system that is responsive to road conditions.

FIG. 2 shows an embodiment of a route planning system that is responsive to road conditions. Based on a driver input destination, the vehicle retrieves data from a maps database 15-202 and computes a driving plan 15-200. The driving plan may comprise of a specific route and may further include target vehicle speeds. FIG. 2 shows the generalized system which can be used in a priori route planning or in real-time a posteriori driving.

For the embodiment with an advanced route planning correction, the a priori driving plan 15-200 is calculated based on a route planning algorithm such as an A* algorithm or any other suitable route planning method. This is then compared to road condition data 15-204 that has been stored from previous driving data, from other vehicles, or from a database. The road condition data is processed or has already been processed and stored to include a road roughness impact 15-206 metric. In some embodiments this metric may comprise a measure of vertical acceleration on the chassis of the vehicle. In one embodiment, vertical acceleration on the vehicle chassis or in the passenger compartment may be band-pass filtered to cut out frequencies significantly below body frequency and frequencies significantly above wheel frequency. For example, a band-pass filter may have a lower cutoff around 0.5 Hz and an upper cutoff around 20 Hz in order to eliminate extraneous noise that does not impact road roughness impact. Based on the measure of road roughness, the driving plan 15-200 is altered to either bias against rough roads by employing a weight factor directly in the route-planning algorithm, or by avoiding roads that have a road roughness above a certain threshold. In another embodiment, it may result in setting target speeds for each section of road. Several implementation methods exist using weight factors, thresholds, biases, and other algorithms. The road condition data 15-204 and road roughness impact calculator 15-206 may represent a single unit 15-208 that simply represents the road roughness. In general, the a priori system determines a driving plan at least partially in response to anticipated road roughness impact to the vehicle over the roads in the route.

For the a posteriori embodiment, the system operates in real time while executing (i.e. driving) the driving plan 15-200. A driving plan 15-200 is calculated based on a route planning algorithm and using stored maps 15-202. As the vehicle traverses terrain, road condition data 15-204 is acquired such as vertical accelerometer data, road surface information from a forward-looking vision system, data from a stored topographical map, GPS-indexed data, data from other vehicles, and a measure of at least one state variable from an electronic suspension system (such as accelerometer, velocity, and position data from each actuator or semi-active damper). With this road condition data, a road roughness impact calculation 15-206 is performed. This may be a simple root mean squared (RMS) value of acceleration, a comfort heuristic that is a frequency-weighted function of chassis acceleration, or some other means of processing the road condition data to yield a result coupled with road impact to the vehicle and passengers.

Road roughness impact data 15-206 (either current data of the terrain being traversed, a running average of past data, or future data ahead) is used to correct the driving plan 15-200. Adjusting the driving plan may cause the vehicle to choose an alternative route course in order to avoid the road being traversed. Alternatively, it may cause the driving plan to change the vehicle speed over the rough terrain.

Figure 3:
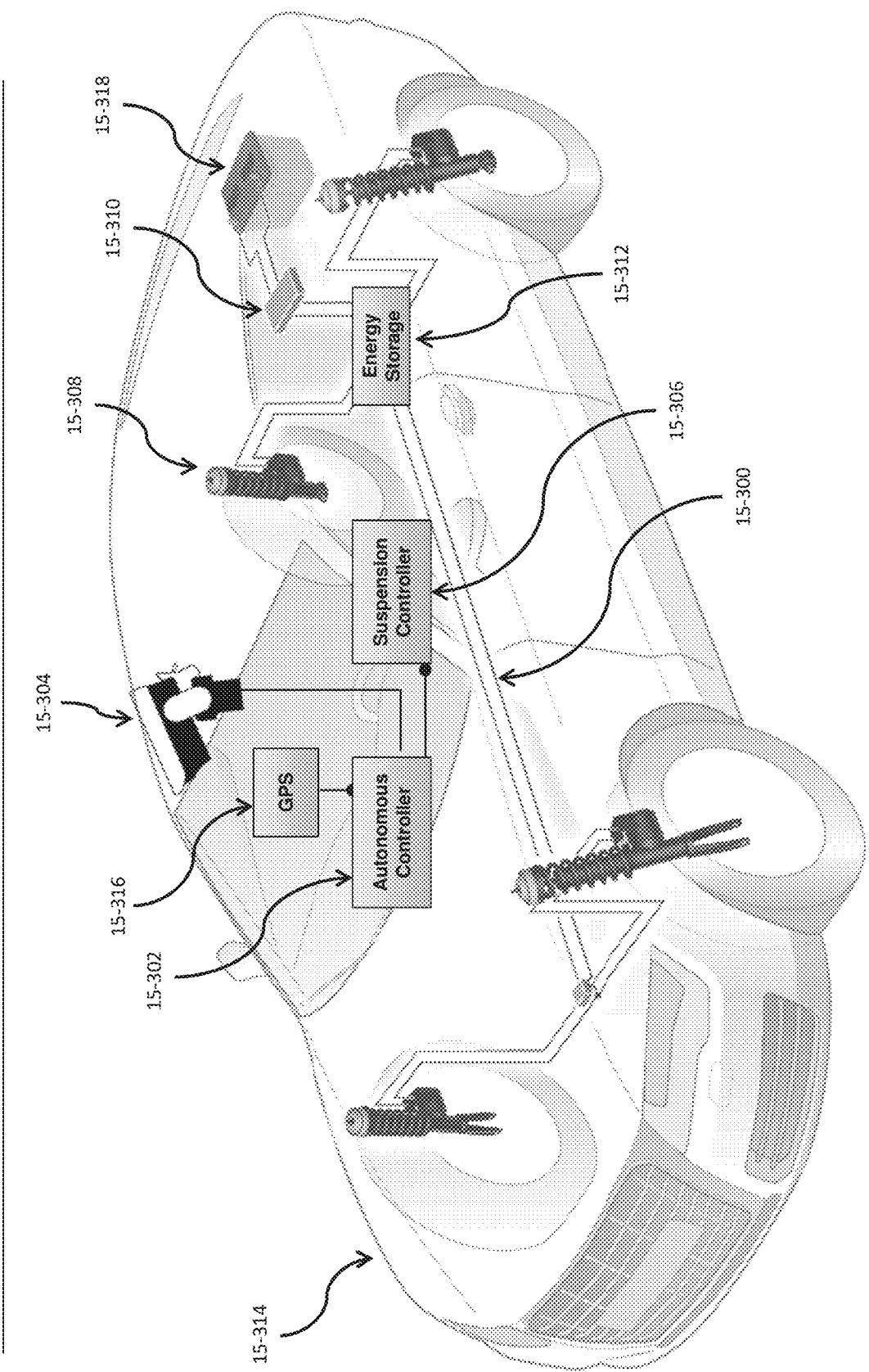
FIG. 3 is an autonomous vehicle with a predictive energy storage subsystem and an integrated active suspension.

FIG. 3 shows an autonomous vehicle with a predictive energy storage subsystem and an integrated active suspension. An electrical bus 15-300 delivers power to a plurality of connected electrical loads. In the embodiment of FIG. 3, the electrical loads comprise of four active suspension actuators 15-308 connected to the bus 15-300. In other embodiments this may comprise of electric power steering systems, electronic stability control actuators, electronic air compressors, ABS braking actuators, rear wheel steering actuators, and other power consumers. An energy storage apparatus 15-312 such as a battery (lead acid, AGM, lithium-ion, lithium-phosphate, etc.), a bank of capacitors (e.g. super capacitors), a flywheel, or any other suitable energy storage device is attached to the electrical bus 15-300. The energy storage device can be characterized by a state of charge. For example in a capacitor, a voltage level would indicate this. For some rechargeable batteries, this could be measured using a coulomb counting battery management system, although with many battery technologies a state of charge can be determined by a voltage reading. In this embodiment, the energy storage system is disposed to provide energy to at least a portion of the electrical loads on the bus. A power converter 15-310, in this embodiment a bi-directional DC-DC converter that transfers power between the vehicle's electrical system and the electrical bus 15-300, is configured to provide power to the energy storage apparatus and the connected electrical loads. By controlling the electrical loads and the power converter, a state of charge of the energy storage apparatus can be set. In some embodiments the power converter 15-310 can set a state of charge of the energy storage apparatus 15-312 without knowing the state of charge. For example, the power converter can provide more energy than the loads are consuming in order to increase a state of charge, and likewise the power converter can provide less energy than the loads are consuming in order to decrease the state of charge.

Disposed on the vehicle of FIG. 3 is a forward-looking stereo vision camera (or LIDAR, radar, side sensor, rear sensor, etc.) 15-304 that is able to detect road obstacles and obstructions. This camera system may connect with the autonomous control system 15-302, which may comprise of one or a plurality of devices such as processor-based controllers. The sensor may also connect directly to the suspension controller, although in this embodiment the autonomous controller uses the stereo vision system for vehicle navigation tasks as well. The autonomous controller 15-302 calculates a driving plan for an anticipated route of the vehicle by mapping a route to a user-defined destination. This driving plan may change dynamically, for example it may be responsive to changing traffic conditions. The driving plan may be highly granular such as taking a specific line or lane along a road. Based on sensed data such as through the vision camera 15-304, this driving plan may dynamically change such as to avoid an emergency-braking vehicle in the vehicle's lane ahead.

The power converter 15-310 may regulate the state of charge of the energy storage 15-312 during the route. Several such exemplary circumstances where the energy storage might be used are given:

In one circumstance, the GPS unit 15-316 detects the vehicle's position is approaching a known rough road that is on the driving plan and the vehicle is in an economy mode, where a significant amount of energy might be regenerated by a regenerative suspension system. This processing may occur in a controller outside the GPS unit that may have access to the topographical map with road roughness criteria. The power converter can be controlled to deliver energy from the electrical bus 15-300 to the vehicle's electrical system in order to reduce the state of charge of the energy storage so that it can accommodate at least some of the regenerated energy. Once the road is being traversed, regenerated energy may be provided to both the energy storage apparatus as well as to the vehicle's electrical system through the power converter.

In another circumstance, the GPS unit 15-316 detects that the vehicle's position is approaching a winding road that is on the driving plan of the vehicle. An algorithm calculates needed energy for the active suspension actuators to provide active roll control and for the electric power steering to provide steering input, and charges the energy storage apparatus such that while the winding road is being traversed, peak power demand from both devices is delivered by both the energy storage apparatus and the power converter from the vehicle's electrical system 15-318 such that the power converter does not exceed a vehicle electrical system maximum current threshold.

In another circumstance, the vehicle 15-314 is an electric or hybrid car with a high voltage battery pack as an energy storage device. For example, the vehicle may be an autonomous electric vehicle with a rear mounted drive motor and a 400-volt battery pack. In this embodiment, the energy storage may comprise the battery pack, and the electrical bus may comprise the high voltage bus the battery is connected to. The vehicle calculates a driving route and estimates energy usage from connected loads (for example, the main drive motor and an active suspension system). Such an estimate may comprise a measure of road roughness and cornering to determine an active suspension system consumption, and a measure of acceleration, stop lights, vehicle speeds, terrain incline and distance to determine a main drive motor consumption and regeneration. In the event of an electric vehicle, for example, the vehicle may want to further control the loads such as the active suspension and main drive motor to ensure that the autonomous vehicle may reach its destination with the amount of energy on board the vehicle. In other electric vehicle embodiments, the active suspension system may run off an intermediate voltage bus on the vehicle such as a 48V bus that communicates with the high voltage system through a DC-DC converter.

In another circumstance, the vehicle determines a driving plan for the vehicle and target speeds. It estimates energy usage that each device on the electrical bus 15-300 will use for each location of travel, which may be a function of target speed and other parameters. During execution of the driving plan, the energy storage state of charge may be predictively set in advance of the energy usage event.

The above examples are illustrative, but many such conditions may exist where the energy storage is regulated in order to anticipate upcoming conditions.

In the event of an active suspension, two major energy consumption factors are the condition of the road and the amount of body roll and heave motion. These factors among others can be used to estimate the energy consumption from an active suspension system.

In some embodiments, the energy storage apparatus operates most durably when maintained between a lower threshold voltage and an upper threshold voltage. This may be accomplished by executing regulation of the power converter and regulation of at least a portion of the plurality of connected loads. For example, a controller may reduce energy consumption in a load so that the energy storage does not drop below a lower threshold. In other embodiments this may be accomplished by applying switches such as MOSFET or IGBT transistor based switches to the energy storage apparatus.

Figure 4:
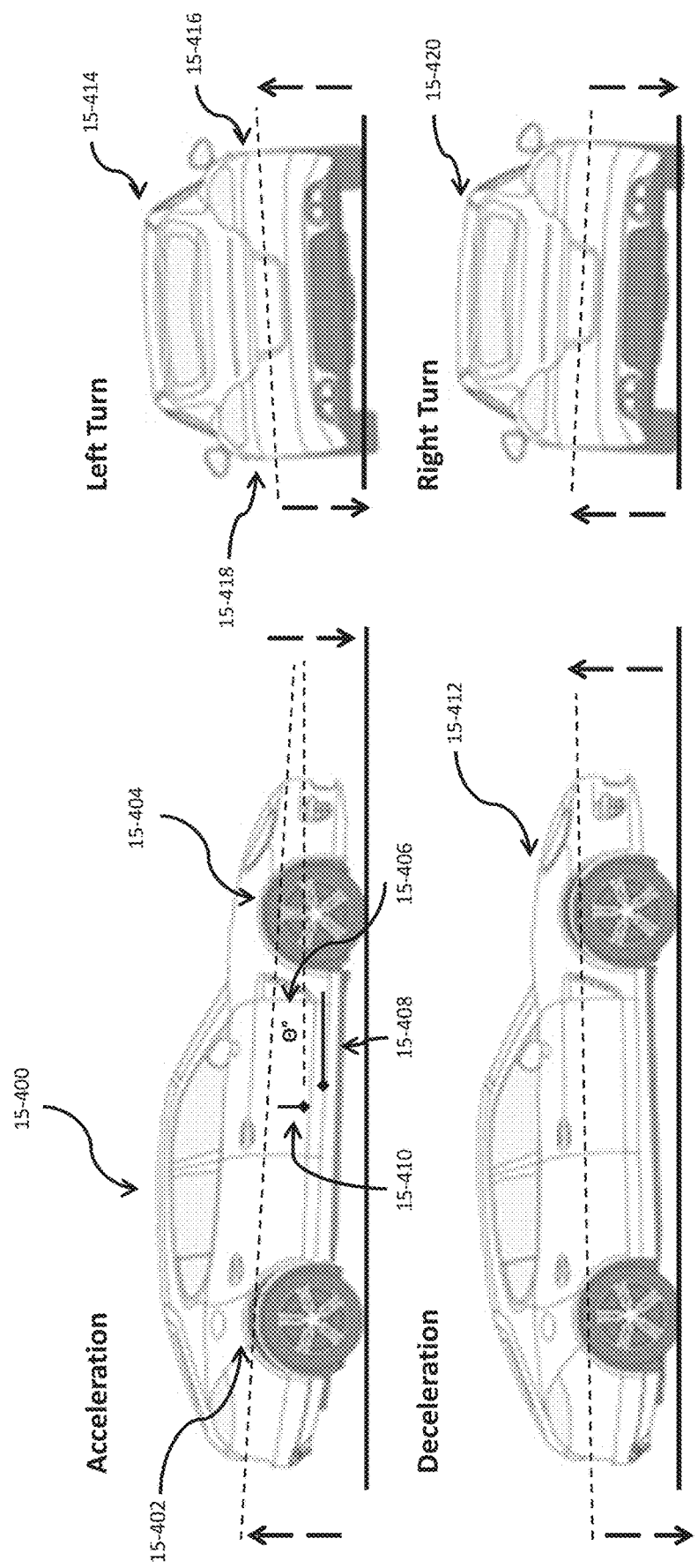
FIG. 4 is an adaptive pitch/roll system that creates a compensation attitude in response to feed-forward drive commands.

FIG. 4 demonstrates an active suspension control system for a vehicle that mitigates fore/aft and lateral acceleration and deceleration feel by pitching and tilting the vehicle. The vehicle comprises active suspension actuators at each wheel of the vehicle. A self-driving controller creates command signals that accelerate/decelerate the vehicle and create steering events that yield a lateral acceleration.

During forward acceleration, the vehicle 15-400 pitches forward (pitch down attitude wherein the front of the vehicle is below the vehicle centerline) by creating an extension force from the rear actuators 15-402 and a compression force from the front actuators 15-404. Force is provided in order to set a compensation attitude 15-406 in pitch that is greater than zero degrees and related to the acceleration of the vehicle. Acceleration of the vehicle creates a longitudinal force 15-408 on the passengers that is equal to their mass multiplied by the vehicle's acceleration. By tilting the vehicle with a compensation attitude 15-406, the longitudinal force from the vehicle acceleration is multiplied by the cosine of the compensation angle 15-406, and a component of gravitational force 15-410 acts to counteract the acceleration force by operating in the opposite direction. This longitudinal force component from gravity on the passengers is equal to their mass multiplied by the acceleration of gravity (9.8 m/s/s) multiplied by the sine of the compensation attitude. To equalize forces so there is no longitudinal net force, the tangent of the compensation attitude must equal the vehicle acceleration divided by gravity. Therefore, a compensation attitude to create equal forces would be the arctangent of the quotient of the vehicle acceleration and (divided by) the acceleration of gravity.

In an illustrative example, the zero net longitudinal force compensation attitude during a 0.3 g vehicle acceleration is approximately 17 degrees pitch forward. In real world-application, it is desirable for energy savings and for practical suspension design considerations to create a compensation attitude that is oftentimes less than this net force balance. Therefore, the compensation angle 15-406 may be less than the arctangent of the quotient of vehicle acceleration and the acceleration of gravity.

During deceleration, the vehicle 15-412 pitches backward (pitch up attitude wherein the front of the vehicle is above the vehicle centerline). In this instance, force from the actuators operates in a similar but opposite fashion. Compensation attitudes can be found using similar methodologies as during acceleration, but by referencing a compensation attitude angle from the rear of the vehicle instead of the front.

During a left turn of the vehicle 15-414, the actuators 15-418 on the inside of the turn radius create a compression force, while the actuators 15-416 on the outside of the turn create an extension force, such that the vehicle leans into the turn. Similarly, this compensation attitude in roll may be greater than zero, but less than or equal to the arctangent of the quotient of lateral acceleration and gravity.

During a right turn of the vehicle 15-420, force from the actuators operates in a similar but opposite fashion. Compensation attitudes can be found using similar methodologies as during a left turn, but by referencing a compensation attitude angle from the right side of the vehicle instead of the left for roll angle.

During both turn events the roll in attitude comprises of the side of the vehicle on the inside radius of the turn being below the roll centerline as shown in FIG. 4. In more aggressive turns, the actuators may become force limited (in saturation), and this performance may not be met.

By employing these compensation attitudes in advance of the vehicle response by employing a feed-forward control strategy, a self-driving vehicle may mitigate discomfort associated with autonomous acceleration, deceleration, and steering. Such a feed-forward strategy may be employed by connecting the autonomous controller or driving system with the active suspension such that a compensation attitude is commanded based on an acceleration/steering signal from the controller. A compensation attitude can be calculated as a function of the signal. In some embodiments entry into the compensation attitude is gradual and occurs over an extended period of time that is a function of the feed-forward signal from the self driving controller. Exit from the compensation attitude may also be gradual and occur over time. In some embodiments that active suspension actuators have a maximum force limit which may be a physical limit or a software parameter (including a dynamic software parameter that is updatable in real time), and a target compensation attitude is not fully reached during high acceleration, deceleration, and roll events. This is called a force-limited mode. Since compensation attitude performance may be jarring to some passengers, in some embodiments it may be desirable to turn the feature on and off, or into different modes of operation (for example, that set different levels of compensation attitudes) based on a vehicle operator selected operational mode.

Figure 5:
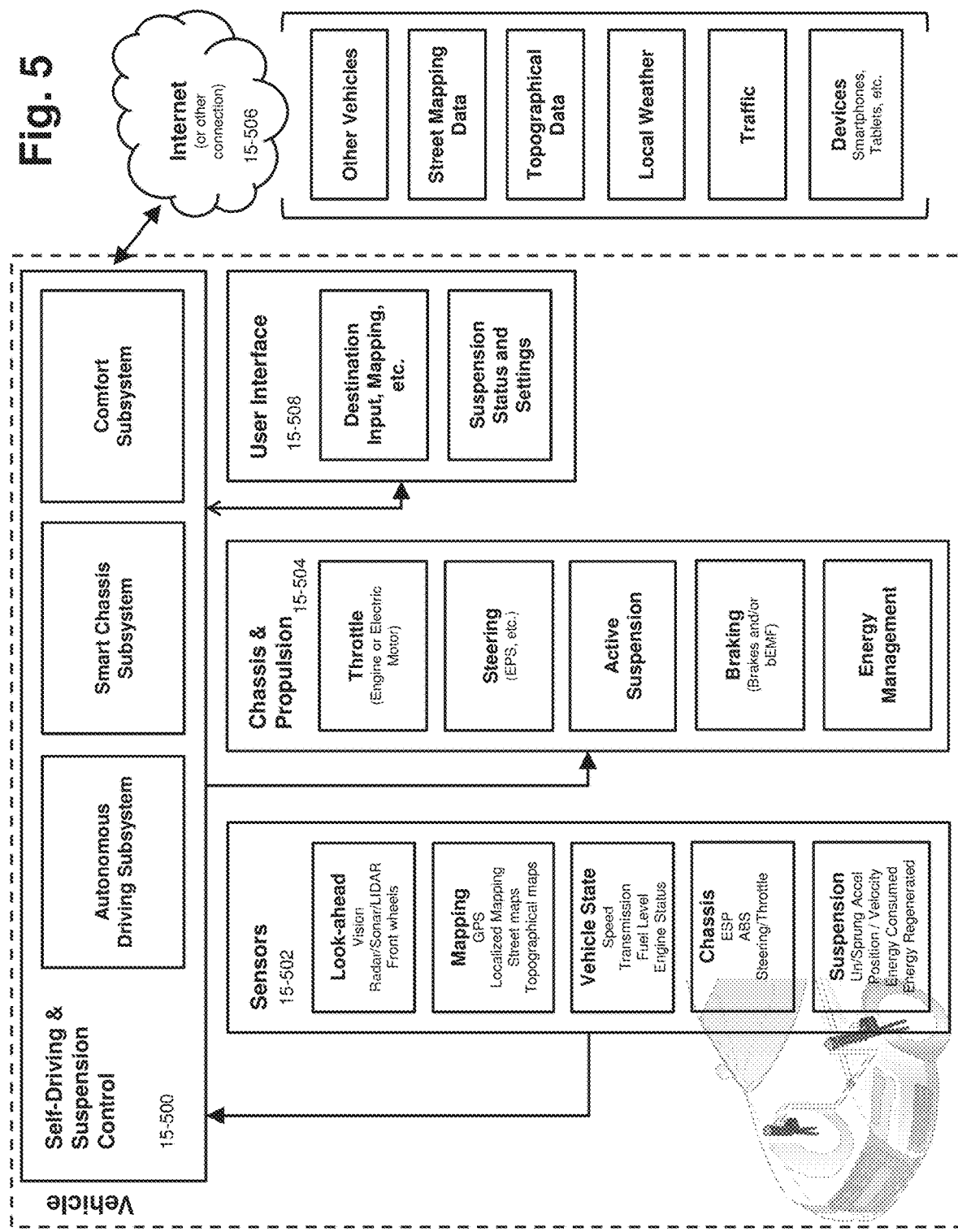
FIG. 5 is a block diagram of a self-driving vehicle with integrated adaptive chassis systems.

In FIG. 5 a self-driving vehicle with an integrated active suspension system is shown. The main control system 15-500 comprises controllers for the autonomous driving subsystem, the smart chassis subsystem, and the comfort subsystem. These controllers may be on a single controller or a plurality of controllers distributed about the vehicle. The autonomous driving subsystem is responsible for navigation, route planning, obstacle avoidance, and other driving related tasks. The smart chassis subsystem is an integrated control system that combines control tasks for a number of chassis and propulsion technologies. The comfort subsystem may provide control to a number of comfort systems such as controlling the active suspension system, interior cabin amenities, and may provide settings to the propulsion system to adjust throttle and steering response. The self-driving vehicle may have a number of sensor technologies on-board 15-502 which may be beneficially coupled with other vehicle systems such as an active suspension. These sensors include look ahead sensors (vision, radar, sonar, LIDAR, front wheel movement), mapping (GPS, localized mapping, street maps, topographical maps), vehicle state (speed, transmission state, fuel level, engine status), chassis sensors (ESP status, ABS status, steering/throttle position), and suspension sensors (unsprung and sprung mass acceleration, suspension position, velocity, energy consumed/regenerated). The chassis and propulsion systems 15-504 such as throttle, steering, active suspension, braking, energy management for the vehicle, and other chassis related technologies may be operatively controlled by the main control system blocks. A user interface 15-508 may be used to accept vehicle operator inputs such as destination inputs to compute a route or driving plan such as on an LCD touchscreen. In addition, suspension status may be viewed and algorithm settings may be programmed via the user interface. Finally, the self-driving vehicle may be connected via a network connection 15-506 such as to the internet. This network may connect the vehicle with data from other vehicles, with street mapping data, stored topographical data, local weather information, traffic information, and vehicle operator devices such as smartphones, tablets, etc. Vehicle operator devices may be used to further control the vehicle, such as allowing a destination input via a smartphone. Many of the above systems may be combined together and operatively communicate with one another in order to improve overall system performance. In addition, many of the technologies discussed in this specification may be operatively combined with features and modules shown in FIG. 5.

Figure 6:
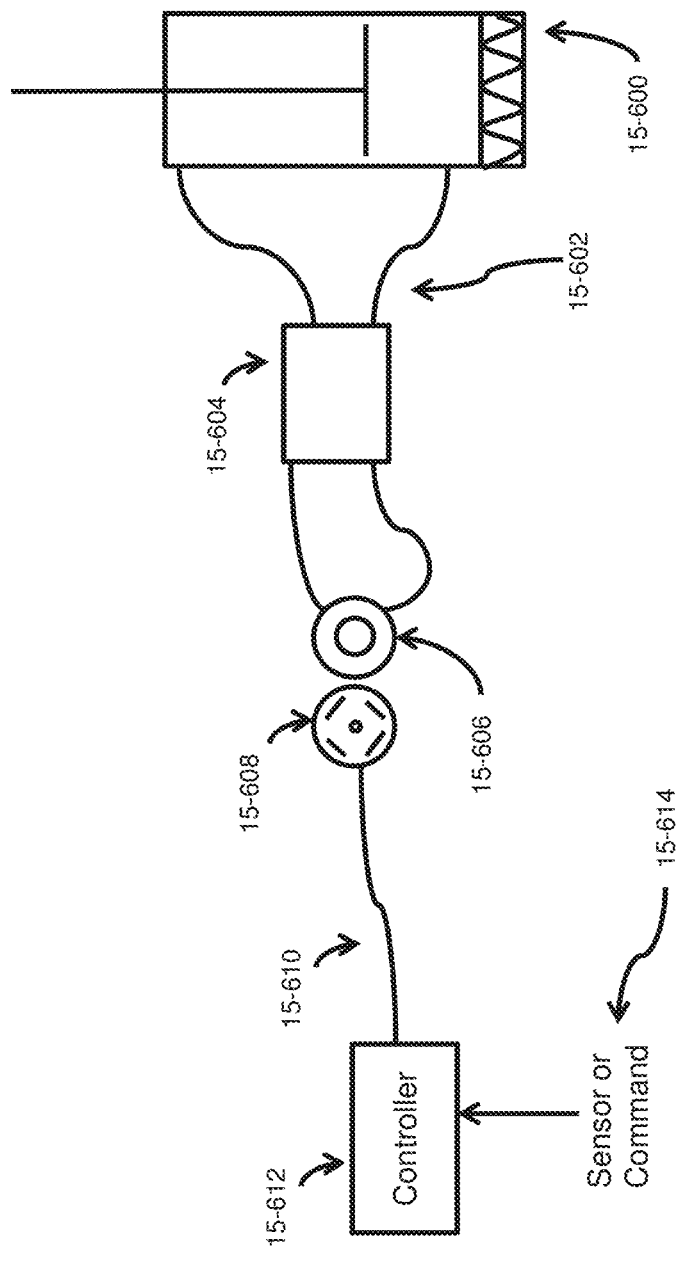
FIG. 6 is a drawing of an on-demand energy flow active suspension embodiment.

FIG. 6 demonstrates one embodiment of an active suspension actuator that operates in at least three operational quadrants of a force-velocity plot (with respect to the actuator). A hydraulic actuator 15-600 comprising a piston rod and piston head disposed in a housing, along with a gas filled accumulator (which may be inside the hydraulic actuator housing or in fluid communication externally), is connected via fluid communication channels 15-602 to a hydraulic motor/pump 15-606 (which may be a pump, a motor, or both). The fluid communication may pass through one or more valves 15-604 that are configured either in series with the fluid, in parallel with the pump, some combination of the two, or this may be a straight connection without any valving. In one embodiment this valving may include a fluid-velocity responsive diverter valve that opens a bypass path around the hydraulic motor at a predetermined fluid velocity, while still allowing some fluid to enter the hydraulic motor during the diverted bypass stage.

The hydraulic motor/pump is operatively coupled to an electric motor 15-608 such that rotation of the electric motor in a first direction causes fluid to pump into a compression volume of the hydraulic actuator, and rotation of the electric motor in a second direction causes fluid to pump into an extension volume of the hydraulic actuator. The electric motor is electrically connected via at least one wire 15-610 to a controller 15-612 that controls the motor. Motor control may comprise of torque control, velocity control, or some other parameter. The controller is responsive to algorithms operating the active suspension and/or to sensors or commands 15-614. For example, commands for actuator force or position may come from a vehicle system. An example of a suitable sensor is an accelerometer. The system is controlled in an on-demand energy manner such that energy is consumed or regenerated in the motor to rapidly create a force on the actuator.

Figure 7:
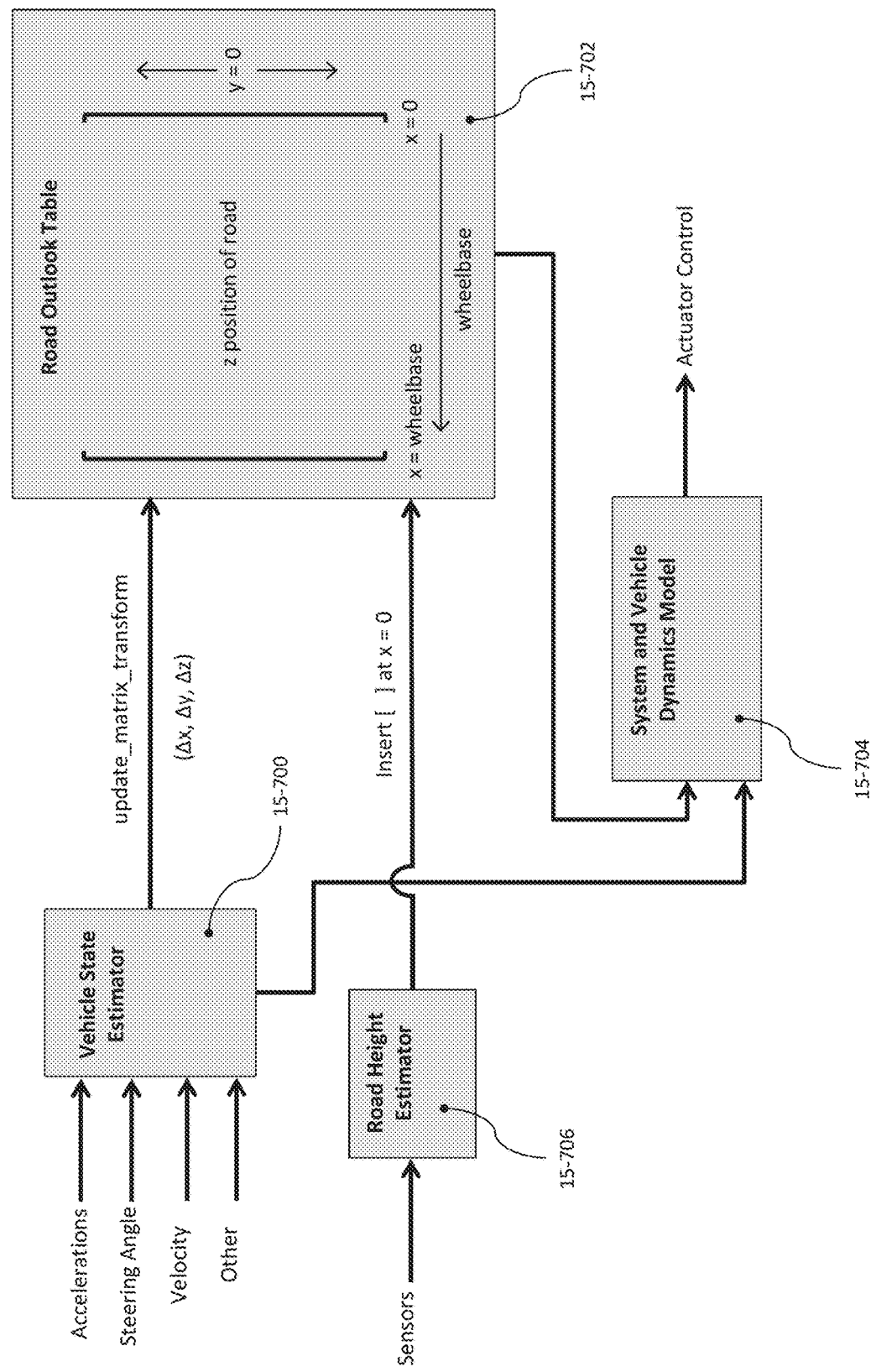
FIG. 7 is an embodiment using a topographical road mapping system that uses front wheels as a predictive sensor for rear wheels to control an active suspension system.

FIG. 7 is one embodiment of a topographical map that is specific to using data from the front wheels to provide improved response with the rear wheels of an active suspension. This may be beneficially combined with several technologies discussed in conjunction with sections discussing topographical maps, and shows one potential implementation of such a map. This may also be combined with several other elements in this specification, and is not limited to vehicles that are self-driving (i.e. it applies to human-operated vehicles).

In FIG. 7, a vehicle state estimator 15-700 determines a vehicle's kinematic state based on a number of sensors such as accelerometers, steering angle, vehicle velocity (wheel speed sensors, GPS, etc.). This functional unit calculates how the vehicle is moving across the terrain, and outputs a change in (x, y, z) coordinates for each time step. These coordinate deltas serve as a relative matrix transformation vector that is used to transform a topographical map, and may further comprise a rotation vector if the vehicle is turning. The topographical map in this embodiment is a road outlook table 15-702 that comprises a two dimensional matrix indexed by x values and y values, and containing z positions (heights) of the road for each relative coordinate. At the zero value of x is the terrain direction below the front axle, while the maximum value of x is the rear axle. The center of y is shown as the center of the car, with positive and negative values stretching to the track width of the vehicle. Therefore, the road outlook table 15-702 comprises a topographical map relative to the car and encompassing the road underneath the vehicle from front axle to rear axle, left side to right side of the vehicle. In other embodiments this road outlook table could be larger. For example, it could extend far in front of the vehicle and be seeded with data using look-ahead sensors, or it could extend past the sides of the vehicle. The road outlook table is fed into a system and vehicle dynamics model 15-704 that calculates a model-based open loop correction signal based on the upcoming z position of the road to each wheel, and creates an actuator control to mitigate the event. Meanwhile, sensors such as the front accelerometers or position sensors (or any sensor that indicates road information) are fed into a road height estimator 15-706, which estimates a z position of the road. For example, the wheel and body response to a certain bump may be measured using sensors and then an estimate determined of road height that caused the bump. In this embodiment where the sensors comprise the front wheels, this data is inserted at x equals zero, however it would be whatever corresponding position for the topographical map at hand. Since sensor data is not all encompassing across the x, y plane, a secondary method may operate to fill blank data slots with estimated road height. A number of methods can be used to accomplish this, but linear or quadratic interpolation between measured data points is one suitable method.

Using the methodology of FIG. 7, the vehicle can use information from the front wheels in an accurate manner that accounts for vehicle movement including steering and other effects. In addition, it can be robustly integrated with multiple predictive sensors including look-ahead sensors, GPS data, and front wheel sensors. All of these may dynamically update the topographical map, and where there is redundant data a best estimate between the multiple values is used.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:
1. A self-driving vehicle, comprising:
 a plurality of active suspension actuators;
 a self-driving vehicle controller that receives information about a destination and is configured to plan a route to reach the destination based on the received information, wherein the self-driving vehicle controller is con- figured to determine a path of travel of a wheel to be traveled by the wheel during at least a portion of the planned route; and an active suspension controller that receives information about the path of travel of the wheel from the self-driving vehicle controller, and wherein the active suspension controller controls at least one of the plurality of active suspension actuators based at least partially on the information about the path of travel of the wheel from the self-driving vehicle controller.

2. The self-driving vehicle of claim 1, wherein the self-driving vehicle controller obtains information about the path of travel of the wheel.

3. The self-driving vehicle of claim 2, further comprising: a data storage system that includes a map with three-dimensional terrain information, wherein at least a portion of the information obtained by the self-driving vehicle controller about the path of travel of the wheel is data obtained from the map.

4. The self-driving vehicle of claim 3, wherein the active suspension controller identifies an event located along the path of travel of the wheel based at least partially on the data obtained from the map.

5. The self-driving vehicle of claim 3, wherein the map is updated by information provided to the self-driving vehicle controller by the active suspension controller.

6. The self-driving vehicle of claim 3, wherein the map comprises three-dimensional terrain information with a coordinate system that is relative to the vehicle and is dynamically updated.

7. The self-driving vehicle of claim 3, wherein the map comprises three-dimensional terrain information with an absolute coordinate system related to latitude/longitude coordinates and containing road surface height information.

8. The self-driving vehicle of claim 3, wherein only a portion of the map is buffered on the data storage system.

9. The self-driving vehicle of claim 3, wherein at least a portion of the map is transmitted from another vehicle.

10. The self-driving vehicle of claim 3, wherein the map includes three-dimensional terrain information from a past driving event of the vehicle.

11. The self-driving vehicle of claim 3, further comprising at least one forward-looking sensor capable of detecting a road condition, wherein at least a portion of the information obtained by the self-driving vehicle controller about the path of travel of the wheel is obtained from the forward looking sensor.

12. The self-driving vehicle of claim 11, wherein the map is updated based at least on a parameter detected by at least one of the active suspension actuators and the at least one forward-looking sensor.

13. The self-driving vehicle of claim 11, wherein the at least one forward-looking sensor comprises at least one of a vision, LIDAR, radar, sonar, and IR sensor.

14. The self-driving vehicle of claim 11, wherein the at least one forward-looking sensor comprises a sensor disposed on a front actuator of the plurality of active suspension actuators.

15. The self-driving vehicle of claim 2, further comprising a vehicle location sensor, wherein at least a portion of the information obtained by the self-driving vehicle controller about the path of travel of the wheel is obtained from the vehicle location sensor.

16. The self-driving vehicle of claim 15, wherein the vehicle location sensor is a GPS receiver.

17. The self-driving vehicle of claim 15, wherein the vehicle location sensor is configured to use at least one of DGPS and WiFi localization.

18. The self-driving vehicle of claim 15, further comprising at least one relative sensor that detects at least one of relative position and relative movement between the vehicle and the ground, wherein at least a portion of the information obtained by the self-driving vehicle controller about the path of travel of the wheel is obtained from the at least one relative sensor.

19. The self-driving vehicle of claim 18, wherein the at least one relative sensor is at least one of an IMU, an accelerometer, a speed sensor, a suspension velocity sensor, and a steering angle sensor.

20. The self-driving vehicle of claim 18, further comprising a sensor fusion system that determines an absolute position of the vehicle using information from the vehicle location sensor and the at least one relative sensor, wherein at least a portion of the information obtained by the self-driving vehicle controller about the path of travel of the wheel is obtained from the sensor fusion system.

21. The self-driving vehicle of claim 20, wherein the sensor fusion system comprises a Kalman Filter.

22. A method of operating a vehicle, the method comprising:

planning a route of travel for a vehicle with an autonomous controller;

determining a path of travel of a wheel based on the planned route; and controlling an active suspension actuator based at least partially on the path of travel of the wheel.

23. The method of claim 22, further comprising obtaining road surface data about the path of travel of the wheel.

24. The method of claim 23, further comprising obtaining the road surface data from a topographical map.

* * * * *